J. H. REID.
PROCESS OF SECURING METAL FROM ORES.
APPLICATION FILED JAN. 13, 1914.
1,195,607.
Patented Aug. 22, 1916.
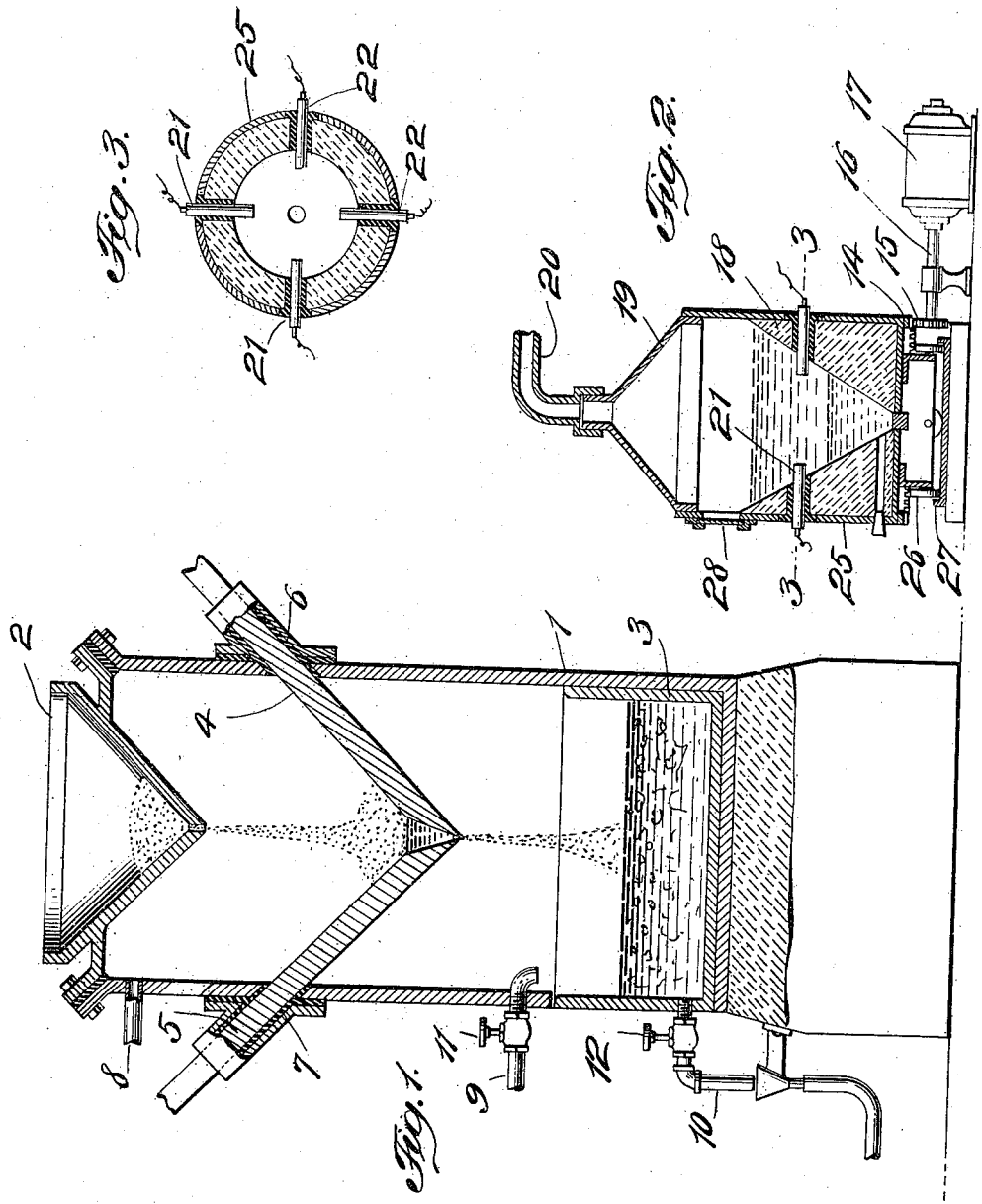

UNITED STATES PATENT OFFICE.

JAMES HENRY REID, OF NEWARK, NEW JERSEY.

PROCESS OF SECURING METAL FROM ORES.

1,195,607.

Specification of Letters Patent. Patented Aug. 22, 1916.

Application filed January 13, 1914. Serial No. 811,805.

*To all whom it may concern:*

Be it known that I, JAMES HENRY REID, a citizen of the United States, residing at 352 Mulberry avenue, in the city of Newark, county of Essex, State of New Jersey, have invented certain new and useful Improvements in Processes of Securing Metal from Ores, of which the following is a specification.

This invention relates to the separation of metals from refractory or other ores and has for one of its objects the isolation and recovery of metal from refractory ore, such as nickel-cobalt-silver ore, in a simple effective and economical manner and comprises exposing the ore to the combined action of a comparatively high-melting-point metal, such as iron, and electricity, in such a manner that the iron or other metal or ore disintegrator and metal absorber or securer, will disrupt the ore, facilitate the fusion of the silicious content, and combine with, dissolve, or secure the ore metal, such as nickel, cobalt and silver in the case noted, in the molten iron or like metal vehicle, from which it can be recovered by the action of other metals, immiscible with iron or other high melting-point metal solvent or vehicle, having greater affinity or solvent action for the metal primarily separated from the ore, for example silver, such as lead.

As an example of the process and manner whereby the same is performed, the separation of silver from nickel and cobalt contained in a nickel-cobalt-silver ore, in free or combined state with nonmetallic elements, will be taken, reference being directed to the accompanying drawings which illustrate a form of apparatus for carrying out the same in which, Figure 1 is an elevation partly in section of an electric furnace for the initial treatment of the ore, Fig. 2 is a vertical section of a rotatable metal separator, and Fig. 3 is a cross section of the separator on lines 3—3 of Fig. 2.

Similar numerals of reference represent corresponding parts in the various views.

Referring to the drawings the numeral 1 designates a furnace shell or body provided at the top with the ore feed or hopper 2, for introducing the ore and a removable metal collecting reservoir 3 at the bottom.

Passing into the furnace are the fusible electrodes 4 and 5, insulated from the furnace body by and through suitable non-conductive bearings 6 and 7. The furnace shell is provided with a fume or gas outlet 8 through which the gaseous by-products may be withdrawn by suction and recovered. The lower portion of the furnace body is provided with a water inlet 9 and the removable metal reservoir with the water outlet 10 controlled by the valves 11 and 12 respectively, whereby water may be passed into, through, and out of the metal reservoir to quench the metal as it falls and remove in suspension particles of silicious matter disrupted from the ore metal. The electrodes 4 and 5 are connected with suitable contacts (not shown) whereby an electric current may be communicated to and passed therethrough. This furnace is employed for the initial treatment of ore whereby it is disrupted upon falling on and between the electrodes 4 and 5 from the feed hopper 2 while an electric current is passed therethrough resulting in the fusion of the electrodes 4 and 5 and the union of the same with the metal of the ore which falls and is collected in the watercooled reservoir 3.

In Fig. 2 is shown an apparatus whereby the metal collected in the reservoir 3 shown in Fig. 1 is separated and comprises the shell or body 11 lined with suitable refractory material. This furnace or metal separating device is rotatable about a vertical axis and is provided with a series of roller bearings 26 which run on the track 27. The rotatable separator is provided with an annular gear 14, on the underside and adapted to engage the cog-wheel 15 of the shaft 16 which is revolved by the electric motor 17 whereby the separator may be revolved at any desired speed. The separator is provided also with a refractory lining 18 and the cover 19 from which the fumes and gas discharge 20 extends whereby the fumes and gases may be removed from the separator by a suction device (not shown). The separator is also provided with the electrodes 21 and 22 whereby the contents of the separator may be fused or maintained in a molten condition through the employment of an electric current during the process of metal separation. The electrodes being in contact with suitable connections or devices (not shown) for communicating the electric current when desired.

In carrying out the process for the separation of nickel and cobalt from silver combinations in the ore electrodes of cast iron are employed. The ore is granulated and placed in the feed hopper 2. Water is placed in or supplied to reservoir 3 and continuously supplied thereto through the valve 23 and discharged through the overflow or outlet pipe or conduit 24. Electricity is then passed through the electrodes 4 and 5 and caused to arc between them by drawing them apart, the preferable current being of alternating and polyphase form or character. When an arc has been sprung between the iron electrodes the ore is fed from the feed hopper 2 which supplies it to the space between the electrodes and in the arc at the same time the gases which are evolved are removed from the apparatus by suction through the exhaust pipe or conduit 8. As the ore reaches the arc it fuses volatilizing some of the ingredients and fuses the ore matrix liberating any free metal therein which unites or alloys with the fused iron of the electrode which falls into the water-containing reservoir 3 and is quenched while the silicious or nonmetallic substances are largely washed away by the flowing stream of water. At the same time that the fused iron of the electrodes seizes the free metal in the ore it combines with oxygen or other nonmetallic elements combined with the ore metal to be separated thereby deoxidizing or reducing them to metallic state while the metal thus released also unites with the excess of iron which fuses from the electrodes; the amount of electrode or iron which thus fuses corresponds to about one-third of the weight of the ore treated.

When the ore has all been thus treated and the metals have been united with the metal of the electrodes and accumulated in the reservoir 3 the electric current is shut off, the flow of water through the reservoir stopped by closing the valve 23, the receptacle or reservoir 3 removed from the furnace and the metal collected therein secured. This metal is then placed in the separator shown in Fig. 2 and fused, where it is maintained in a fused or melted condition by passing electricity therethrough by means of the electrodes 21 and 22.

When the metal is properly melted and so maintained in the separator, lead is added in proportion of two parts of lead to every part of silver in the iron, the whole separator is then given a circulatory motion by means of the motor 17 which actuates the shaft 16 and the cog-wheel 15 which engages the annular gear 14 and causes the separator to revolve. This revolving of the separator is continued for five or ten minutes in order to give the lead a chance to circulate and come in contact with all the silver, gold, or similar metal in the iron which is soluble in the molten lead and to dissolve it, at which time the revolving motion is stopped and the lead with its captured metals, such as silver, gold, etc., is allowed to settle after which it is tapped out and the iron residue recast into new electrodes while the silver and gold are finally separated from the lead by any well known means. When the iron eventually becomes suitably saturated with nickel and cobalt after reuse several times it is treated in such a manner that the nickel and cobalt are secured or separated therefrom. While this separating action is going on in the rotary separator any fumes or vapors which may be evolved are removed by exhaustion through the outlet or exit pipe or conduit 20.

The electric contacts communicating with the electrodes 21 and 22 are attached and detached during the heating and prior to giving the separator a rotary motion.

The electrodes may be of any desired metal or composition of fusible conductive substance selective to absorb or dissolve the metal to be separated or secured from any ore or to reduce or deoxidize the ore metal compound. The fusibility of the electrodes controls and governs the temperature at the reduction or disintegrating zone in that they fuse and run away at selective temperatures and thus avoid overheating and volatilization which might otherwise occur in metal of the ores if the temperature should be too high. These fusible electrodes therefore accomplish several important and valuable results in conjunction with the electric current, such as disintegrating the ore body or matrix, seizing the ore metal, and maintaining a temperature at approximately that at which the electrode melts, so that by regulating the fusibility of the electrodes by employing independent metals or mixtures having superior affinity for the metal of the ore and selective melting points below the volatilizing point of the ore metal desired it can be alloyed or secured by the fused electrode and carried down into the metal reservoir of the ore disintegrating and metal separating furnace.

Lead or other immiscible metal separating vehicle may be used or employed. The melting point of the metal may be reduced or it may be dissolved or liquefied below its normal melting point and the reducing or deoxidizing power of the electrode enhanced by its association with substances having such superior affinity for oxygen or other nonmetallic elements combined with the ore metal to be reduced and separated, such as aluminium, calcium, etc., individually or collectively.

Having now described my invention what I claim as new and desire to secure by Letters Patent is:—

1. The process of securing metal from ore which comprises exposing the metal-containing ore to the progressive action of a substantially high melting point metal and electricity and a comparatively low melting point metal immiscible with the high melting point metal and having a superior affinity for the ore metal secured thereby and finally recovering the desired ore metal from the metal vehicle or carrier.

2. The process of securing metal from ore which comprises exposing the metal-containing ore to the progressive action of a substantially high melting point metal electrode and electricity and a comparatively low melting point metal immiscible with the high melting point metal and having a superior affinity for ore metal secured thereby and finally recovering the desired ore metal from the final metal vehicle or carrier.

3. The process of securing metal from ore, which comprises supplying ore to an electric arc between depending fusible electrically conductive materials capable of reducing the ore metal compound and seizing the ore metal, and reducing and securing the metal from the ore while falling from an upper to a lower level.

4. The process of securing metal from ore, which comprises supplying ore to an electric arc between depending fusible metal capable of reducing the ore metal compound and seizing the ore metal, and reducing and securing the metal from the ore while falling from an upper to a lower level.

5. The process of securing metal from ore, which comprises supplying ore to an electric arc between depending iron conductors and recovering the metal of the ore associated with iron while falling from an upper to a lower level.

In testimony whereof I affix my signature in presence of two witnesses.

JAMES HENRY REID. [L. S.]

Witnesses:
  CHAS. C. LANE,
  ELMER E. SULLIVAN.

Copies of this patent may be obtained for five cents each, by addressing the "Commissioner of Patents, Washington, D. C."